US009670367B2

(12) United States Patent
Li et al.

(10) Patent No.: US 9,670,367 B2
(45) Date of Patent: Jun. 6, 2017

(54) ELECTROPHORETIC DISPERSION

(71) Applicant: E Ink California, LLC, Fremont, CA (US)

(72) Inventors: Yu Li, Fremont, CA (US); Hui Du, Milpitas, CA (US); Haiyan Gu, Fremont, CA (US)

(73) Assignee: E INK CALIFORNIA, LLC, Fremont, CA (US)

(*) Notice: Subject to any disclaimer, the term of this patent is extended or adjusted under 35 U.S.C. 154(b) by 213 days.

(21) Appl. No.: 14/325,261

(22) Filed: Jul. 7, 2014

(65) Prior Publication Data
US 2014/0339481 A1 Nov. 20, 2014

Related U.S. Application Data

(63) Continuation-in-part of application No. 13/360,482, filed on Jan. 27, 2012, now abandoned.

(51) Int. Cl.
H01B 1/12 (2006.01)
C09C 3/10 (2006.01)
G02F 1/167 (2006.01)
C09C 1/36 (2006.01)
C09C 1/40 (2006.01)
C09C 1/56 (2006.01)
C09C 1/04 (2006.01)
C09C 1/22 (2006.01)
C09C 3/12 (2006.01)
C09C 1/24 (2006.01)
B41J 2/01 (2006.01)
G02B 26/00 (2006.01)
G02F 1/00 (2006.01)

(52) U.S. Cl.
CPC .............. C09C 3/10 (2013.01); C09C 1/043 (2013.01); C09C 1/22 (2013.01); C09C 1/24 (2013.01); C09C 1/3676 (2013.01); C09C 1/3684 (2013.01); C09C 1/40 (2013.01); C09C 1/407 (2013.01); C09C 1/56 (2013.01); C09C 3/12 (2013.01); G02F 1/167 (2013.01); C01P 2004/50 (2013.01); C01P 2006/40 (2013.01); G02F 2001/1678 (2013.01)

(58) Field of Classification Search
USPC ...... 252/500, 518.1, 519.33, 519.5; 359/296, 359/321; 525/267, 269, 340, 353; 526/172, 213; 204/600; 347/107; 430/32
See application file for complete search history.

(56) References Cited

U.S. PATENT DOCUMENTS 4,285,801 A * 8/1981 Chiang ............... G03G 17/04 252/570
6,930,818 B1 8/2005 Liang et al.
7,230,750 B2 6/2007 Whitesides et al.
7,352,502 B2 4/2008 Miyazaki et al.
7,375,875 B2 5/2008 Whitesides et al.
8,363,306 B2 1/2013 Du et al.
2005/0270628 A1* 12/2005 Miyazaki ............... B01J 13/14 359/296
2011/0139035 A1* 6/2011 Gottschalk-Gaudig ............... B41M 5/5218 106/287.34
2012/0112131 A1 5/2012 Li et al.
2013/0193385 A1 8/2013 Li et al.

FOREIGN PATENT DOCUMENTS

WO WO 01/67170 9/2001

OTHER PUBLICATIONS

Allen, K. (Oct. 2003). Electrophoretics Fulfilled. *Emerging Displays Review: Emerging Display Technologies, Monthly Report—Oct. 2003*, 9-14.
Bardsley, J.N. & Pinnel, M.R. (Nov. 2004) Microcup™ Electrophoretic Displays. *USDC Flexible Display Report*, 3.1.2. pp. 3-12-3-16.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.
Chen, S.M. (Jul. 2003) The Applications for the Revolutionary Electronic Paper Technology. *OPTO News & Letters*, 102, 37-41. (in Chinese, English abstract attached).
Chen, S.M. (May 2003) The New Application and the Dynamics of Companies. *TRI*. 1-10. (In Chinese, English abstract attached).
Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.
Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.
Ho, C., & Liang, R.C. (Dec. 2003). *Microcup® Electronic Paper by Roll-to-Roll Manufacturing Processes*. Presentation conducted at FEG, Nei-Li, Taiwan.
Ho, Candice. (Feb. 1, 2005) *Microcupt® Electronic Paper Device and Application*. Presentation conducted at USDC 4th Annual Flexible Display Conference 2005.
Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.
Lee, H., & Liang, R.C. (Jun. 2003) SiPix Microcup® Electronic Paper—An Introduction. *Advanced Display*, Issue 37, 4-9 (in Chinese, English abstract attached).
Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

(Continued)

Primary Examiner — Bijan Ahvazi
(74) Attorney, Agent, or Firm — David J. Cole

(57) ABSTRACT

The present invention is directed to an electrophoretic dispersion comprising charged pigment particles dispersed in a solvent or solvent mixture, wherein at least one type of the charged pigment particles has an aggregation size about 2 to about 10 times their primary size and/or has a PDI in the range of 0.1 to 0.3. The electrophoretic dispersion of the present invention is capable of improving both image bistability and contrast ratio through adjusting the size distribution of the charged pigment particles.

10 Claims, No Drawings

(56) References Cited

OTHER PUBLICATIONS

Liang, R.C. (Apr. 2004). *Microcup Electronics Paper by Roll-to-Roll Manufacturing Process*. Presentation at the Flexible Displays & Electronics 2004 of Intertech, San Fransisco, California, USA.
Liang, R.C. (Oct. 2004) *Flexible and Roll-able Displays/Electronic Paper—A Technology Overview*. Paper presented at the METS 2004 Conference in Taipie, Taiwan.
Liang, R.C., & Tseng, S. (Feb. 2003). *Microcup® LCD, A New Type of Dispersed. LCD by a Roll-to-Roll Manufacturing Process*. Paper presented at the IDMC, Taipei, Taiwan.
Liang, R.C., (Feb. 2005) *Flexible and Roll-able Displays/Electronic Paper—A Brief Technology Overview*. Flexible Display Forum, 2005, Taiwan.
Liang, R.C., Hou, J., & Zang, H.M. (Dec. 2002) Microcup Electrophoretic Displays by Roll-to-Roll Manufacturing Processes. *IDW*, EP2-2, 1337-1340.
Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.
Liang, R.C., Hou, J., Zang, H.M., & Chung, J. (Feb. 2003). *Passive Matrix Microcup® Electrophoretic Displays*. Paper presented at the IDMC, Taipei, Taiwan.
Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.
Liang, R.C., Zang, H.M., Wang, X., Chung, J. & Lee, H., (Jun./Jul. 2004) « Format Flexible Microcup® Electronic Paper by Roll-to-Roll Manufacturing Process » , Presentation conducted at the 14th FPD Manufacturing Technology EXPO & Conference.
Nikkei Microdevices. (Dec. 2002) Newly-Developed Color Electronic Paper Promises—Unbeatable Production Efficiency. *Nikkei Microdevices*, p. 3. (in Japanese, with English translation).
Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA.).

Wang, X., Kiluk, S., Chang, C., & Liang, R.C. (Feb. 2004). Mirocup® Electronic Paper and the Converting Processes. *ASID*, 10.1.2-26, 396-399, Nanjing, China.
Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).
Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.
Wang, X., Zang, H.M. and Li, P. (Jun. 2006) Roll-to-Roll Manufacturing Process for Full Color Electrophoretic film. *SID Digest*, 2006, pp. 1587-1589.
Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.
Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.
Zang, H.M. (Oct. 2003). *Microcup® Electronic Paper by Roll-to-Roll Manufacturing Processes*. Presentation conducted at the Advisory Board Meeting, Bowling Green State University, Ohio, USA.
Zang, H.M. (Feb. 2004). *Microcup Electronic Paper*. Presentation conducted at the Displays & Microelectronics Conference of U.S. Display Consortium, Phoenix, Arizona, USA.
Zang, H.M. (Sep. 2006) *Monochrome and Area Color Microcup® EPDs by Roll-to-Roll Manufacturing Process*. Presentation conducted at the Fourth Organic Electronics Conference and Exhibition (OEC-06), Sep. 25-27, 2006, Frankfurt, Germany.
Zang, H.M. (Feb. 2007) *Developments in Microcup® Flexible Displays*. Presentation conducted at the 6th Annual Flexible Display and Microelectronics Conference, Phoenix, AZ Feb. 6-8.
Zang, H.M., & Liang, R.C. (2003) Microcup Electronic Paper by Roll-to-Roll Manufacturing Processes. *The Spectrum*, 16(2), 16-21.
Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.
Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

\* cited by examiner

ELECTROPHORETIC DISPERSION

This application is a continuation-in-part of U.S. application Ser. No. 13/360,482, filed Jan. 27, 2012 (Publication No. 2013/0193385, now abandoned); the application is incorporated herein by reference in its entirety.

FIELD OF THE INVENTION

The present invention is directed to an electrophoretic dispersion, especially an electrophoretic dispersion capable of improving image bistability and contrast ratio through adjusting the size distribution of the charged pigment particles.

BACKGROUND OF THE INVENTION

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic dispersion composed of a dielectric solvent with charged pigment particles dispersed therein is enclosed between the two electrode plates.

An electrophoretic dispersion may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the pigment particles to migrate to the opposite plate, thereby reversing the color.

Alternatively, an electrophoretic dispersion may have two types of pigment particles of contrasting colors and carrying opposite charge polarities and the two types of pigment particles are dispersed in a clear solvent or solvent mixture. In this case, when a voltage difference is imposed between the two electrode plates, the two types of pigment particles would move to opposite ends. Thus one of the colors of the two types of the pigment particles would be seen at the viewing side.

Further alternatively, an electrophoretic dispersion may comprise more than two types of pigment particles, and therefore it is capable of displaying multiple color states.

For all types of the electrophoretic displays, the dispersion is undoubtedly one of the most crucial parts of the device. The composition of the dispersion determines, to a large extent, the lifetime, contrast ratio, switching rate and bistability of the device.

For the pigment particles in the dispersion, a polymer layer is usually grafted over their surface to facilitate dispersion of the pigment particles in the dispersing solvent and hence the polymer layer is generally solvent compatible. For example, when a hydrocarbon solvent is used as the dispersing solvent, it is desirable to select a polymer with long alkyl side chains as the outer coating layer over the pigment particles. Such surface modified pigment particles, however, cannot provide both good contrast ratio and image bistability, due to the strong inter-particle repulsion force introduced by the surface-grafted polymers.

SUMMARY OF THE INVENTION

The present invention is directed to an electrophoretic dispersion comprising charged pigment particles dispersed in a solvent or solvent mixture, wherein at least one type of the charged pigment particles has an average aggregation size in the range of about 2 to about 10 times their primary size.

In one embodiment, at least 60%, preferably at least 90%, of the at least one type of the charged pigment particles has an aggregation size in the range of about 2 to about 10 times their primary size.

In one embodiment, an electrophoretic dispersion comprises charged pigment particles dispersed in a solvent or solvent mixture, wherein at least one type of the charged pigment particles has a polydispersity index (PDI) in the range of about 0.1 to about 0.3, preferably about 0.15 to about 0.25.

In one embodiment, the at least one type of the aggregated charged pigment particles has a polydispersity index (PDI) in the range of about 0.1 to about 0.3, preferably about 0.15 to about 0.25.

In one embodiment, the at least one type of pigment particles is formed from core particles coated with a copolymer formed from a first type of monomer and a second type of monomer, the homopolymer of the first type of monomer is incompatible with the solvent or solvent mixture in which the pigment particles are dispersed and the homopolymer of the second type of monomer is compatible with the solvent or solvent mixture in which the pigment particles are dispersed.

In one embodiment, the copolymer is a random copolymer or a block copolymer.

In one embodiment, the first type of monomer is styrene, benzyl 2-methylacrylate, methyl acrylate, butyl acrylate, vinyl pyridine, 2-hydoxyethyl acrylate, dimethylaminoethyl methacrylate, acrylic acid or vinyl phosphoric acid.

In one embodiment, the second type of monomer has long alkyl or branched side chains.

In one embodiment, the second type of monomer is lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, or n-octadecyl methacrylate.

In one embodiment, the solvent or solvent mixture is aliphatic hydrocarbon based.

In one embodiment, the molar ratio of the first type of monomer to the second type of monomer is between 5:1 to 1:10.

In one embodiment, the core particles are inorganic particles or organic particles.

DETAILED DESCRIPTION OF THE INVENTION

The present invention relates to size distribution of pigment particles suitable for use in an electrophoretic dispersion.

As stated, an electrophoretic dispersion may comprise one type, two types or multiple types of charged pigment particles dispersed in a solvent or solvent mixture. When there is more than one type of pigment particles, the different types of pigment particles have different optical characteristics, such as color, optical transmission, reflectance, luminescence or, in the case of displays intended for machine reading, pseudo-color in the sense of a change in reflectance of electromagnetic wavelengths outside the visible range.

The inventors have found that when an electrophoretic dispersion comprising at least one type of charged pigment particles having an average aggregation size more than 2 times their primary size, preferably in the range of 2 to 10 times or 4 to 7 times their primary size, the dispersion shows both improved image bistability and contrast ratio, without sacrificing other display performance parameters, such as switching speed.

In one embodiment, in a dispersion, at least 60%, preferably at least 90%, of the at least one type of charged pigment particles, has an aggregation size in the range of 2 to 10 times or 4 to 7 times their primary size.

The term "primary size" is intended to refer to the average size of a single un-aggregated particle.

The term "aggregation size" is intended to refer to the size of aggregated particles in their dispersed state in a solvent or solvent mixture.

In another embodiment of the present invention, an electrophoretic dispersion comprises at least one type of charged pigment particles which has a polydispersity index (PDI) in the range of about 0.1 to about 0.3, preferably about 0.15 to about 0.25. The polydispersity index is an index indicative of particle size distribution, and is a number calculated from a simple 2 parameter fit to the correlation data (the cumulants analysis). The PDI is dimensionless and scaled such that values smaller than 0.05 are rarely seen other than with highly monodisperse standards. Values greater than than 0.7 indicate that the sample has a very broad size distribution. The polydispersity index is measured by the Dynamic Light Scattering technique. The calculations for the index are defined in the ISO standard document 13321:1996 E and ISO 22412:2008.

It has been found that in an electrophoretic dispersion comprising multiple types of charged pigment particles, if one type of the charged pigment particles has a PDI value which is lower than about 0.1 or higher than about 0.3, the contrast ratio (i.e., defined as the ratio of the luminance of the brightest color, e.g., white, to that of the darkest color, e.g., black, that the system is capable of producing) is inferior and it may be at least 10% lower than the contrast ratio provided by a similar dispersion system in which the same type of charged pigment particles has a PDI within the range of about 0.1 to about 0.3.

As stated above, in a dispersion, at least 60%, preferably at least 90%, of the at least one type of charged pigment particles, has an aggregation size in the range of 2 to 10 times their primary size. In this embodiment, the aggregation size of the at least one type of charged pigment particles has a polydispersity index (PDI) in the range of about 0.1 to about 0.3, preferably about 0.15 to about 0.25.

The pigment particles may be surface-grafted by polymers. Depend on the compatibility of the grafted polymer to the dispersing solvent, the agglomeration size of the pigment particles in the dispersion can be adjusted.

The polymer grafted to the surface of the pigment particle may be a copolymer, such as random copolymer or a block copolymer, formed from two types of monomer, a first type of monomer and a second type of monomer. The compatibility of the surface grafted polymer to the solvent or solvent mixture in which the pigment particles are dispersed can be adjusted by selecting an appropriate molar ratio of the first type of monomer to the second type of monomer. For this purpose, the homopolymer of the first type of monomer is preferred to be incompatible with the solvent or solvent mixture in which the pigment particles are dispersed whereas the homopolymer of the second type of monomer is preferred to be compatible with the solvent or solvent mixture in which the pigment particles are dispersed.

For example, if an aliphatic hydrocarbon based solvent is used, the first type of monomer is preferred to have short alkyl (less than five carbon atoms) or aromatic side chains.

Such monomers may include, but are not limited to, styrene, benzyl 2-methylacrylate, methyl acrylate, butyl acrylate, vinyl pyridine, 2-hydoxyethyl acrylate, dimethylaminoethyl methacrylate, acrylic acid, vinyl phosphoric acid or the like.

The second type of monomer, in this case, is preferred to have longer alkyl or branched side chains (five or more carbon atoms). Such monomers may include, but are not limited to, lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, n-octadecyl methacrylate or the like.

The polymerization is typically performed under the same or similar conditions for conventional free-radical polymerization. Polymerization employing the first type of monomer and the second type of monomer is suitably carried out at a reaction temperature in the range of about 50° C. to about 100° C., preferably in the range of about 60° C. to about 80° C., optionally in the presence of a chain transfer agent, such as 2-(dodecylthiocarbonothioylthio)-2-methylpropionic acid and/or a free radical initiator, such as 2,2'-azobis(isobutyronitrile).

By adjusting the loading ratio of two different types of monomer, it is possible to control the agglomeration size of the pigment particles. The loading weight ratio of the first type of monomer to the second type of monomer is preferably between 5:1 to 1:10, more preferably between 2:1 to 1:5. Usually, with the increase of the ratio of the first monomer to the second monomer, the agglomeration size of the pigment particles increases.

While an aliphatic hydrocarbon solvent is specifically mentioned, it is noted that other solvent or solvent mixture may also be used. For example, when a fluorinated solvent is used, the first type of monomer may be any acrylates or methacrylates which do not contain fluorinated groups, while the second type of monomer may be any acrylates or methacrylates with fluorinated alkyl (of three or more carbon atoms) side chains.

In general, the solvent in which the pigment particles are dispersed preferably has a low viscosity and a dielectric constant in the range of about 2 to about 30, preferably about 2 to about 15 for high particle mobility. Examples of such a solvent may include hydrocarbons such as isopar, decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Delaware, polydimethylsiloxane based silicone oil from Dow-corning (DC-200). The solvent or solvent mixture may be colored by a dye or pigment.

The core pigment particles over which the polymer layer is formed may be inorganic or organic pigment particles. Inorganic pigment particles may include, but are not limited to $TiO_2$, $ZrO_2$, ZnO, $Al_2O_3$, Cl pigment black 26 or 28 or the like (e.g., manganese ferrite black spinel or copper chromite black spinel). Organic pigment particles may include, but are not limited to, phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher.

The pigment particles may carry a natural charge or are charged through the presence of a charge controlling agent.

The electrophoretic dispersion of the present invention may further comprise additives such as a dispersant, surfactant and other additives known to be used in an electrophoretic dispersion.

The pigment particles prepared according to the present invention may be used in a one-particle-type dispersion system, a two-particle-type dispersion or a multiple-particle-type dispersion.

In the one particle system, the charged pigment particles are of the same color and carrying the same charge polarity and they have a size distribution as described above.

In a two particle system, there are two types of pigment particles of contrasting colors and carrying opposite charge polarity and at least one of the two types of the pigment particles has a size distribution as described above.

In a multiple-particle system, there are more than two types of pigment particles of visually distinguishable colors. The different types of pigment particles may carry different charge polarities or some of the pigment particles may have the same charge polarity of different levels. In this case, at least one of the multiple types of pigment particles has a size distribution as described above.

The dispersion of the present invention is filled in display cells. The term "display cell" is intended to refer to a micro-container which is individually filled with a display fluid. Examples of "display cell" include, but are not limited to, microcups, microcapsules, micro-channels, other partition-typed display cells and equivalents thereof. The filled display cells are sandwiched between to two electrode layers to form a display device.

It is noted that the word "about" in the context of the present invention is intended to include ±5% of an indicated value.

EXAMPLE 1

Step A: Deposition of
Vinylbenzylaminoethylaminopropyl-trimethoxysilane
on Black Pigment Particles To a 1 L reactor, Black 444 (Shepherd, 80 g), isopropanol (640 g), DI water (24 g), ammonium hydroxide (28%, 0.8 g) and Z-6032 (Dow Corning, 40 g, 40% in methanol) were added. The reactor was heated to 60° C. with mechanical stirring in a sonication bath. After 3 hours, the mixture was centrifuged at 6000 rpm for 10 minutes. The solids were redispersed in isopropanol (300 g), centrifuged and dried at 50° C. under vacuum overnight to produce 78 g of the desired product.

Step B: Preparation of Surface Grafted Polymer on
Pigment Particles

To a 250 mL flask, the particles (5 g) prepared from Step A and 25 g of toluene were added and sonicated for 30 minutes, followed by the addition of 2-ethylhexyl acrylate (10 g), n-butyl acrylate (10 g), 2-(dodecylthiocarbonothioylthio)-2-methylpropionic acid (0.1 g) and azobisisobutyronitrile (AIBN) (10 mg). The flask was purged with nitrogen for 20 minutes and then heated to 80° C. After 16 hours, the polymer coated pigment particles were recovered by centrifugation at 6000 rpm for 10 minutes. The solids produced were redispersed in toluene and centrifuged. This cycle was repeated twice and the solids were dried at 50° C. under vacuum to produce 4.8 g of the final product. The average aggregation size of pigment particles was about 7 times of the primary size of the particles, and over 90% of the pigment particles were in the range of 2 to 10 times of the primary size of the particles.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An electrophoretic display comprising a pair of spaced-apart electrodes and an electrophoretic dispersion disposed between the pair of electrodes, the electrophoretic dispersion comprising charged pigment particles dispersed in a solvent or solvent mixture, wherein at least one type of the charged pigment particles has a polydispersity index (PDI) in the range of about 0.1 to about 0.3, and at least 60% of at least one type of the charged pigment particles has an average aggregation size in the range of about 2 to about 10 times their primary size.

2. The display of claim 1, wherein the at least one type of the charged pigment particles has a polydispersity index (PDI) in the range of about 0.15 to about 0.25.

3. The display of claim 1, wherein said pigment particles are formed from core particles coated with a copolymer formed from a first type of monomer and a second type of monomer, the first type of monomer having a homopolymer which is incompatible with the solvent or solvent mixture in which the pigment particles are dispersed and the second type of monomer having a homopolymer which is compatible with the solvent or solvent mixture in which the pigment particles are dispersed.

4. The display of claim 3, wherein the copolymer is a random copolymer or a block copolymer.

5. The display of claim 3, wherein said first type of monomer is styrene, benzyl 2-methylacrylate, methyl acrylate, butyl acrylate, vinyl pyridine, 2-hydroxyethyl acrylate, dimethylaminoethyl methacrylate, acrylic acid or vinyl phosphoric acid.

6. The display of claim 3, wherein said second type of monomer has long alkyl or branched side chains.

7. The display of claim 3, wherein said second type of monomer is lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, or n-octadecyl methacrylate.

8. The display of claim 3, wherein the molar ratio of the first type of monomer to the second type of monomer is between 5:1 to 1:10.

9. The display of claim 3, wherein said core particles are inorganic particles or organic particles.

10. The display of claim 1, wherein the solvent or solvent mixture is aliphatic hydrocarbon based.

* * * * *